(No Model.) 3 Sheets—Sheet 1.

J. T. & S. W. COLLINS.
BAND CUTTER AND FEEDER.

No. 543,174. Patented July 23, 1895.

WITNESSES:
Edwin L. Bradford
Ralph Wormelle

INVENTORS
John T. Collins
Samuel W. Collins
BY
Patrick O'Farrell
ATTORNEYS.

(No Model.) 3 Sheets—Sheet 2.
J. T. & S. W. COLLINS.
BAND CUTTER AND FEEDER.
No. 543,174. Patented July 23, 1895.
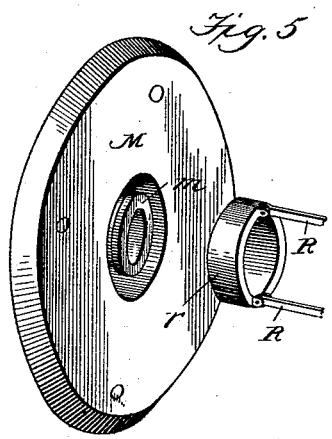
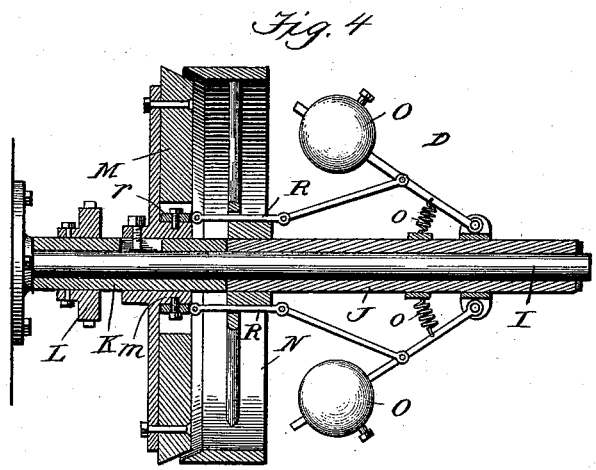
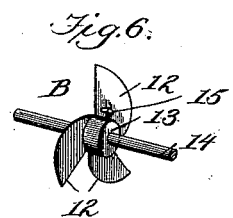
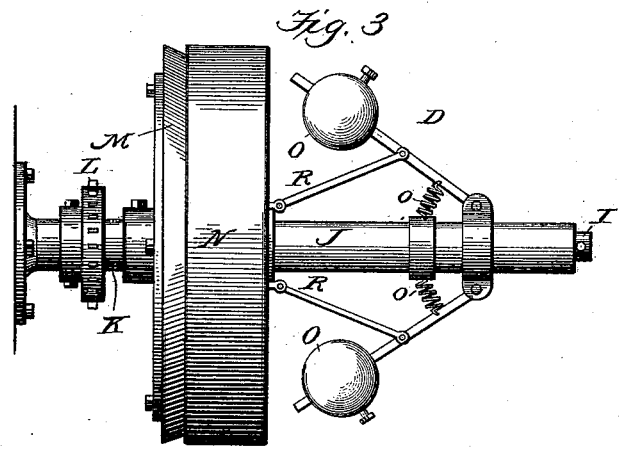
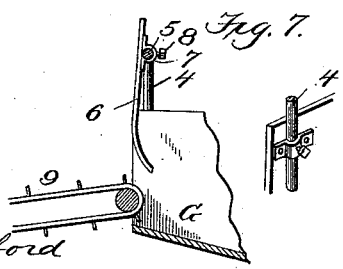
WITNESSES:
Edwin L. Bradford
Ralph Wormelle
INVENTORS
John T. Collins 2nd
Samuel W. Collins
BY
Patrick O'Farrell
ATTORNEYS.

(No Model.)
J. T. & S. W. COLLINS.
BAND CUTTER AND FEEDER.
No. 543,174. Patented July 23, 1895.
3 Sheets—Sheet 3.
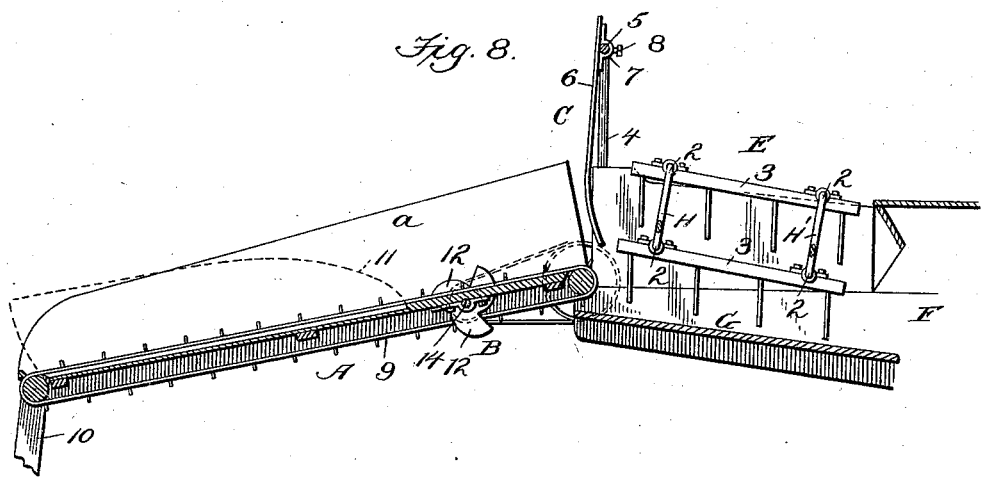
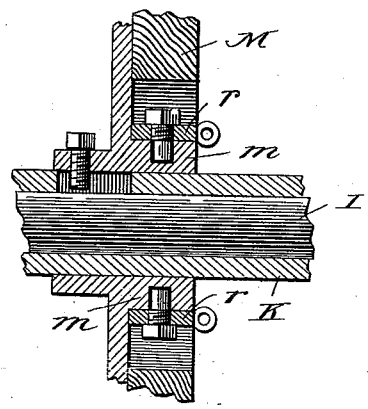
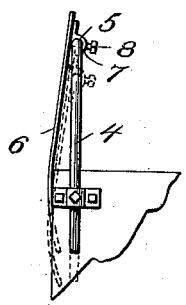
WITNESSES:
Edwin L. Bradford
Ralph Wormelle
INVENTORS
John T. Collins
Samuel W. Collins
BY
Patrick O'Farrell
ATTORNEY.

UNITED STATES PATENT OFFICE.

JOHN T. COLLINS AND SAMUEL W. COLLINS, OF KOKOMO, INDIANA.

BAND-CUTTER AND FEEDER.

SPECIFICATION forming part of Letters Patent No. 543,174, dated July 23, 1895.

Application filed January 29, 1895. Serial No. 536,519. (No model.)

*To all whom it may concern:*

Be it known that we, JOHN T. COLLINS and SAMUEL W. COLLINS, citizens of the United States of America, residing at Kokomo, in the county of Howard and State of Indiana, have invented certain new and useful Improvements in Band-Cutting and Feeding Attachments for Thrashing-Machines, of which the following is a specification, reference being had therein to the accompanying drawings.

The purpose of the present invention is the provision of a band-cutting and feeding attachment for thrashing-machines which will be simple, efficient, and give satisfactory results and which will feed the grain to the thrashing-machine only when the thrashing-cylinder is rotating at a predetermined speed, thereby preventing chocking by overfeeding or by the introduction of wet grain into the thrasher.

A further purpose of the invention is to regulate the quantity of the grain to be fed to the thrasher in a given time, thereby adapting the feeder to the capacity of the thrasher and the motive power for operating the thrasher.

A still further purpose of the invention is to insure the severance of the band binding the grain together and the positive feed of the grain to the thrasher when its thrashing-cylinder is rotating at a given or required speed.

With these and such other objects in view as belong to the nature of the invention the latter consists of the novel features and the peculiar construction and combination of parts which will hereinafter be more fully described and claimed, and which are shown in the accompanying drawings, in which—

Figure 1:
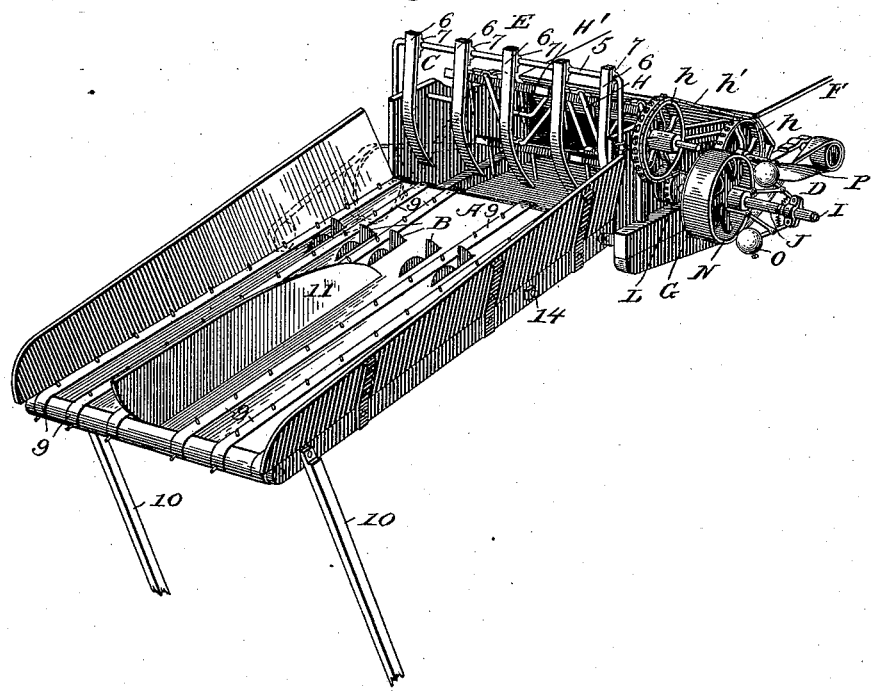
Figure 2:
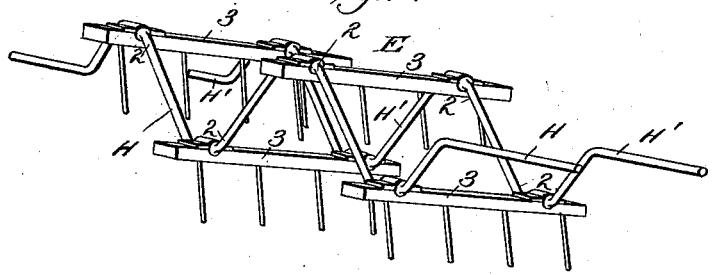

Figure 1 is a perspective view of the invention, showing it applied to a thrasher of ordinary construction. Fig. 2 is a detail view of the reciprocating rakes for feeding the grain over the chute or table usually provided in front of the thrashing-cylinder for the reception of the grain. Fig. 3 is a detail view of the governor on a larger scale. Fig. 4 is a detail view of the spindle and the sleeves carrying the governor and the clutch. Fig. 5 is a detail view of the friction-disk and the connection between it and the governor-arms. Fig. 6 is a detail perspective of a band-cutter. Fig. 7 is a detail view of the means for regulating the quantity of grain fed to the thrasher to suit the capacity of the machine. Fig. 8 is a longitudinal section of the attachment. Fig. 9 is a side elevation of the feeder, showing the vertical adjustment of the regulator. Fig. 10 is a detail view of the friction-disk hub, showing the annular groove therein, on a larger scale, with which the governor connections engage.

The attachment is adapted to be applied to any make and style of thrashing-machine and comprises a folding table A, having the band-cutting knives B, a feed-regulator C, a governor D, and a feeder E, intermediate of the regulator C and the thrasher. The frame of the feeder E is fastened to the frame of the thrashing-machine F at the grain-receiving end, preferably to the chute G, the compound crank-shafts H H' being journaled to the side pieces of the said chute. Sprocket-wheels $h$ are provided at one end of the crank-shafts and are connected by a sprocket-chain $h'$ to cause both shafts H H' to revolve in unison. The alternate portions 2 of the cranks occur in diametrically-opposite relation and have flanges, between which the reciprocating rakes 3 are located; the intermediate portions connecting the cranks 2 extended obliquely, as shown, to prevent entanglement with the straw. The rakes 3 are provided in required number and are mounted upon the cranks 2 in parallel relation.

The regulator C comprises side standards 4, vertically adjustable with the feeder E, a cross-bar 5, connected at its ends to the upper ends of the side standards, and arms 6, having their lower ends curved and provided at their upper ends with bearings 7 to receive the cross-bar 5, upon which they can turn, being held in the required position by means of the binding-screws 8. These arms 6 form guides to impede the too rapid advance of the grain to the feeder E and are vertically adjustable with the frame 4 5 and capable to be turned to any angle to obtain the proper feed of the grain.

The table A is supplied with a proper series of belts 9, having teeth, by means of which the sheaves or bundles of grain are moved forward to the band-cutter and to the feeder E. This table is pivoted to the frame of the feeder, so as to fold close against the end of the thrasher when not required for use and when stored or moving the machine from one place to another, legs or braces 10 supporting the outer end of the table when the latter is in position for use. The divider runs only about two-thirds along the table, so as to allow room for shatterings. The divide 11 is provided to separate the sheaves and cause the latter to move lengthwise along the table. This divide is detachable to enable the full width of the table to be used when required.

The knives B comprise a series of blades 12 and a cast-metal hub 13, through which the shaft 14 passes, a binding-screw 15 passing through the hub 13 to hold the knives upon the shaft 14, so as to revolve therewith. These knives are of highly-tempered steel and revolve at a high rate of speed, so as to insure a severance of the bands confining the grain.

The governor D may be of any suitable construction to effect the desired result—that is, to throw the feeding mechanism out of gear should the speed of the thrashing-cylinder fall below the predetermined rate and again bring the feeding mechanism in gear when the speed of the cylinder reaches the required rate.

As shown, a spindle I is attached to the frame of the attachment, and upon it are mounted two sleeves J and K, so as to turn independently and freely thereon. The sleeve K is slotted, and upon it is mounted a friction-clutch M to turn, yet free to move on the said sleeve. A sprocket-wheel L is held upon the sleeve K and revolves therewith. A pulley N is mounted to revolve with the sleeve J, and the latter carries the weighted arms O, held at the limit of their inward movement by coil-springs $o$. These weighted arms O are connected with the friction-disk M by means of rods R and a collar $r$, the latter encircling the hub $m$ on one side of the disk M, having pins or screws entering an annular groove in the said hub $m$. A belt P from a suitable position of the thrasher-operating mechanism passes around the band-pulley N and rotates it continuously in the operation of the machine.

When the thrashing-cylinder is revolving at a given speed the weighted arms O fly out and draw the disk M in engagement with the rotating pulley N and cause the two to revolve together, and the sprocket-wheel L, turning with the disk D and meshing with the sprocket-chain $h'$, imparts a motion to the latter and actuates the feeder E.

Should the speed of the thrashing-cylinder diminish from any cause, the weighted arms O will move in under the tension of the springs $o$ and disengage the disk M from the disk N and cause the feeder E to cease its functions and cause a stoppage of the feed.

We claim—

1. The combination with a thrashing machine, and a feeder operated from a moving part of the thrashing machine, of a governor comprising a continuously rotated band pulley supported upon a sleeve, a second sleeve operatively connected with the feeder and mounted upon the same spindle with the first sleeve, weighted arms mounted upon the said first sleeve, a friction disk mounted to turn with and move upon the said second sleeve and having a hub provided with an annular groove, a collar encircling the hub and having projections to enter the annular groove therein, and rods passing through the band pulley and connecting the weighted arms with the said collar, substantially as and for the purpose described.

2. In a band cutter and feeder for thrashing machines, the combination with a table having the bundle feeding and the band cutting devices, and a feeder for receiving the loose grain from the said table and delivering it to the thrasher, of a regulator intermediate of the said table and the feeder, the same comprising vertically adjustable side standards, a cross bar connecting the upper ends of the standards and arms mounted upon the said cross bar and having their lower ends curved and adapted to be turned upon the cross bar to any required angle and be held in the adjusted position substantially as set forth.

In testimony whereof we affix our signatures in presence of two witnesses.

JOHN T. COLLINS.
SAMUEL W. COLLINS.

Witnesses:
RALPH WORMELL,
GERALD GRIFFIN.